United States Patent
Osann, Jr.

(10) Patent No.: US 10,070,249 B2
(45) Date of Patent: Sep. 4, 2018

(54) CELL PHONE EMERGENCY MODE FOR LOCATION IN RUBBLE

(71) Applicant: Robert Osann, Jr., Port Angeles, WA (US)

(72) Inventor: Robert Osann, Jr., Port Angeles, WA (US)

(*) Notice: Subject to any disclaimer, the term of this patent is extended or adjusted under 35 U.S.C. 154(b) by 0 days.

(21) Appl. No.: 15/242,469

(22) Filed: Aug. 19, 2016

(65) Prior Publication Data
US 2017/0064072 A1    Mar. 2, 2017

Related U.S. Application Data

(60) Provisional application No. 62/209,980, filed on Aug. 26, 2015.

(51) Int. Cl.
| | |
|---|---|
| H04W 4/02 | (2018.01) |
| H04W 4/90 | (2018.01) |
| H04W 76/50 | (2018.01) |
| H04M 1/725 | (2006.01) |

(52) U.S. Cl.
CPC ......... *H04W 4/02* (2013.01); *H04M 1/72536* (2013.01); *H04W 4/90* (2018.02); *H04W 76/50* (2018.02); *H04M 2250/12* (2013.01); *Y02D 70/00* (2018.01); *Y02D 70/142* (2018.01); *Y02D 70/144* (2018.01); *Y02D 70/164* (2018.01); *Y02D 70/26* (2018.01)

(58) Field of Classification Search
CPC . H04M 1/72572; H04W 76/007; H04W 4/22; H04W 4/02; Y02B 60/50
See application file for complete search history.

(56) References Cited

U.S. PATENT DOCUMENTS

| | | |
|---|---|---|
| 6,960,986 B2 | 11/2005 | Asama et al. |
| 7,046,987 B2 | 5/2006 | Siegel et al. |
| 7,477,144 B2 | 1/2009 | Albert |
| 7,522,035 B2 | 4/2009 | Albert |
| 7,640,003 B1 * | 12/2009 | Pan ........................ G08B 21/02 455/127.1 |
| 7,904,244 B2 | 3/2011 | Sugla |
| 9,747,468 B1 * | 8/2017 | Campbell ............. G06F 21/629 |
| 2003/0129977 A1 | 7/2003 | Dolwin |
| 2004/0203843 A1 | 10/2004 | Najafi |
| 2004/0224659 A1 | 11/2004 | Cheng |
| 2004/0263338 A1 | 12/2004 | Katz |

(Continued)

*Primary Examiner* — Brandon J Miller

(57) ABSTRACT

Mobile phones, phone systems, and emergency location systems are described with features that assist rescue teams in locating survivors in a disaster situation where a phone user and their mobile phone are buried under rubble. To enable the phone's battery charge to last longer, an emergency power conservation mode (E-mode) is activated by either receiving a command from an external source via RF transmission, or by noticing a rapid reduction in signal strength from a tower without changing the phone's physical location. Transmissions are also made by the phone from time to time indicating the user's health condition including providing an indication of life. Portable RF devices may be deployed at grid positions to locate mobile phones by triangulation based on signals received from mobile phones while battery charge still exists for the mobile phones immediately following the disaster.

20 Claims, 2 Drawing Sheets

(56) References Cited

U.S. PATENT DOCUMENTS

| | | | |
|---|---|---|---|
| 2006/0009191 A1* | 1/2006 | Malone, III | H04W 4/22 455/404.1 |
| 2008/0272919 A1 | 11/2008 | Newman et al. | |
| 2009/0176457 A1* | 7/2009 | Christensen | G01S 13/50 455/69 |
| 2010/0245091 A1 | 9/2010 | Singh et al. | |
| 2010/0311387 A1 | 12/2010 | Cameron et al. | |
| 2011/0028117 A1 | 2/2011 | Pan | |
| 2013/0343284 A1* | 12/2013 | Yeh | H04W 76/007 370/328 |
| 2014/0011469 A1* | 1/2014 | Fenn | H04W 4/90 455/404.1 |
| 2014/0253326 A1* | 9/2014 | Cho | G08B 25/10 340/539.13 |
| 2015/0317809 A1* | 11/2015 | Chellappan | H04W 4/90 455/404.1 |
| 2015/0346316 A1* | 12/2015 | Cheng | G01S 5/0284 455/456.1 |
| 2016/0043771 A1* | 2/2016 | Mohamadi | H04B 1/7163 340/8.1 |

* cited by examiner

_US 10,070,249 B2_

CELL PHONE EMERGENCY MODE FOR LOCATION IN RUBBLE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

PRIORITY CLAIM

This application claims priority to and incorporates by reference U.S. Provisional Application No. 62/209,980 filed on Aug. 26, 2015 by inventor Robert Osann, Jr., and entitled "Cell Phone Emergency Mode for Location in Rubble".

FIELD OF THE INVENTION

This invention relates to cellular mobile phone systems, and systems and methods for operating those systems during an emergency such that victims can be located and their condition may be determined.

BACKGROUND

Emergency circumstances occur when a person or persons are buried under rubble. These circumstances can arise from a variety of events, including but not limited to: earthquakes; intentional or unintentional explosions; structural failures due to age, weather, and/or stresses; hurricanes; tsunami tidal waves; etc. The composition of rubble may include but not be limited to: building structures and/or earth and stone.

Locating people buried in rubble after a disaster is difficult, and yet time is precious in order to preserve life. Sniffer dogs are used with limited success. Radar Systems designed to emit and detect electromagnetic waves that penetrate rubble can be useful, however they are prohibitively expensive. In less developed countries, few if any such radar systems are typically available. A cell phone in proximity to a trapped victim can be located by sensing systems as long as its battery lasts. Even then, a cell phone that is transmitting does not necessarily indicate that its user is alive. Given the tremendous effort, resources, time, and risk that are required to attempt to uncover each victim, it is preferable that a cell phone can indicate the presence of life, and most importantly that its battery lasts as long as possible.

Cell phones consume the greatest amount of power when transmitting, so minimizing transmission duty-cycle and transmission signal strength will preserve battery life. Also, a cell phone will increase its transmission strength and power consumption as well as the power consumption of its receiver circuitry when it "thinks" it is farther from a cell tower. Receiver circuits usually consume more power when placed into modes with the purpose of improving sensitivity and signal-to-noise ratio. Thus, if cell towers are non-functional after a disaster, or if a trapped individual's phone thinks it is a long distance from a tower because of signal attenuation through rubble, the phone may increase its transmission signal strength and receiver circuit sensitivity accordingly, and use up its battery charge prematurely.

SUMMARY

One object of the invention is to provide a method for operating a mobile phone in an emergency mode (hereinafter: E-mode) when suddenly buried by rubble, comprising: detecting a sudden reduction in signal strength received from a first cellular base station; determining that a position of the mobile phone has not changed during the sudden reduction in signal strength; and if the position of the mobile phone has not changed during the sudden reduction in signal strength, entering the E-mode including reducing one or more of: a signal strength of transmissions by the mobile phone; a transmission duty cycle by the mobile phone; and receiver circuit power consumption of the mobile phone.

Another object of the invention is to provide a method for determining that the sudden reduction in signal strength received from the first cellular base station is not due to a vertical movement of the phone.

Another object of the invention is to provide a method for determining movement of the mobile phone by analyzing signals received from GPS satellites.

Another object of the invention is to provide a method for determining the movement of the mobile phone by analyzing information supplied by a sensing device included in the mobile phone.

Another object of the invention is to provide a method for detecting an E-mode initiating command sent from a cellular base station or other RF transmitter, and in response entering E-mode.

Another object of the invention is to provide a method such that upon entering E-mode, an audible message is played to a user of the phone announcing the entry into E-mode, and including one or more of: explaining the function of E-mode; explaining how to continue to use the mobile phone while minimizing battery consumption under E-more operation; explaining how to send a message to emergency responders if the user is not able to reach the phone; and explaining how to cancel E-mode if there is no emergency present.

Another object of the invention is to provide a method for detecting an E-mode initiating command sent from an RF transmitting system, and in response to detecting the E-mode initiating command, entering E-mode including reducing one or more of: a signal strength of transmissions by the mobile phone; a transmission duty cycle by the phone; and receiver circuit power consumption of the mobile phone.

Another object of the invention is to provide a method for detecting an E-mode initiating command sent from an RF transmitting system where the RF transmitting system is a portable RF transmitting system, a cellular base station, or a portable cellular base station.

Another object of the invention is to provide a method for operating an E-mode on a mobile phone, including: detecting an E-mode initiating command sent from an RF transmitting system and in response operating the mobile phone in the E-mode including: reducing one or more of: a signal strength of transmissions by the phone; a transmission duty cycle of the phone; and receiver circuit power consumption of the mobile phone, while from time to time analyzing sounds detected by a microphone included with the mobile phone and transmitting information indicative of those sounds.

Another object of the invention is to provide a method for differentiating between background noise and voice noise, where sounds related to voice noise are compressed and burst transmitted, and where burst transmission reduces transmission duty cycle and minimizes power consumption.

Another object of the invention is to provide a method for differentiating between background noise, voice noise, and sounds related to life signs, where the sounds related to life signs include one or more of breathing and heartbeat, and where the sounds related to life signs are compressed and burst transmitted.

Another object of the invention is to provide a method for compressing audio information related to the detected sounds, transmitting the compressed audio information, and analyzing the compressed audio information on a server or in the Cloud.

DETAILED DESCRIPTION

Figure 1:
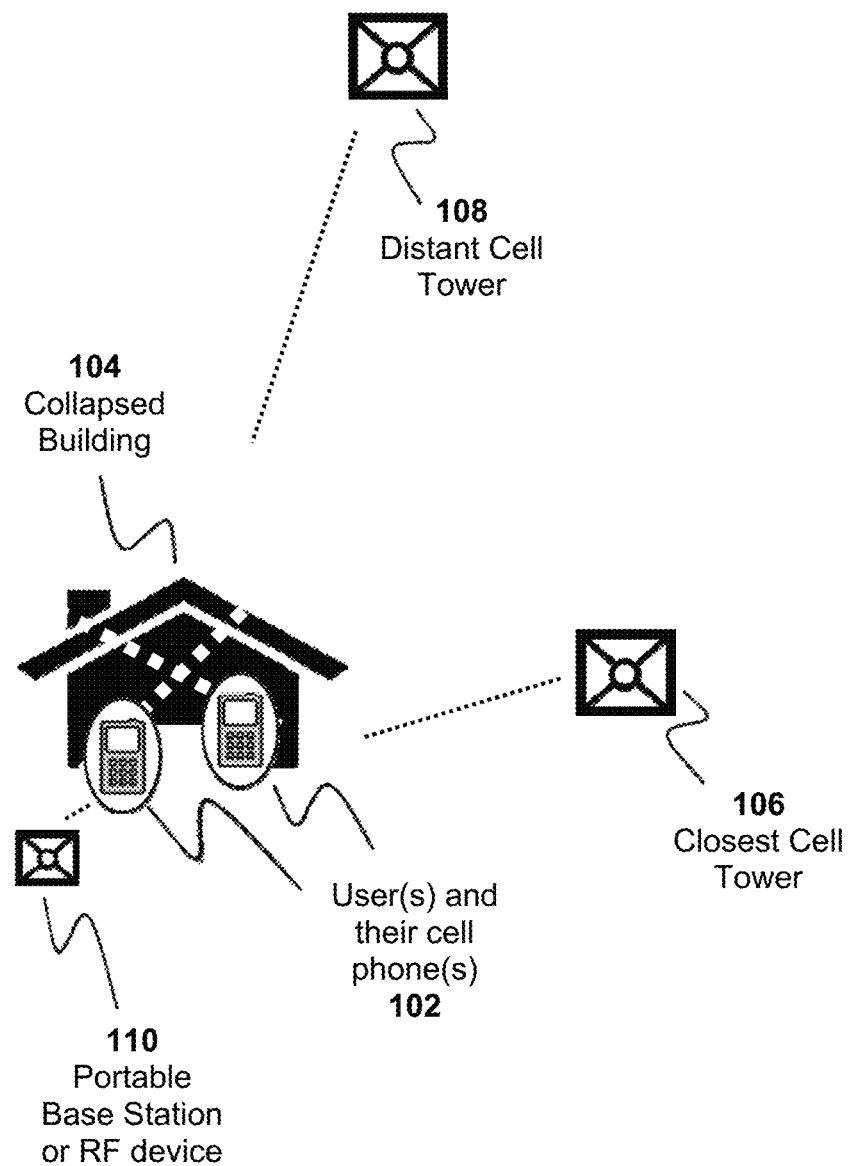
FIG. 1 shows a geographical overview where one or more phones buried in rubble are within various distances of established cell towers and a mobile cellular base station or portable RF device placed in close proximity to the buried phones.

A cellular/mobile phone is described with features that assist in locating victims in a disaster situation where a phone user is buried under rubble. To enable the phone's battery charge to last longer, a power conservation mode is activated by either receiving a command from an external source via RF transmission, or by noticing a rapid reduction in signal strength from a tower without appreciably changing the phone's physical location in a horizontal plane. Transmissions are also made by the phone from time to time indicating the user's health condition, and/or enabling the user to communicate with emergency responders while minimizing power consumption on the phone. Portable RF devices may be deployed at grid positions to locate mobile phones by triangulation based on signals received from mobile phones while battery charge still exists for the mobile phones during a time period immediately following the disaster.

The present invention provides at least these important benefits while in Emergency Mode (hereinafter: E-mode):
1) It assists rescue workers in locating people buried in rubble after a disaster.
2) It maintains battery life for as long a period as possible;
3) It provides an indication that a person in close proximity to the mobile phone is alive.

Since a cell phone may increase it's transmit power when it gets a faint signal—or no signal—from a tower, the E-mode according to this invention greatly reduces the duty-cycle for transmission power consumption and at times also the transmission signal strength. E-mode may also reduce power consumption for receiver circuits within the phone since in response to faint signals, receiver circuits frequently activate modes of operation to increase sensitivity and signal-to-noise ratio, and in doing so increase power consumption.

E-mode also disables functions that consume power but are unnecessary in E-mode when a phone is buried. Examples of these are WiFi and Bluetooth functions which both have very limited range due to limited transmission power, and by operating in the 2 to 5 GHz range have very low ability to penetrate rubble. Any other background apps that run on the phone should also be suspended unless they are critical for operation in E-mode.

Indication of Life

Since people trapped in rubble may be unconscious or constrained in such a way that they are unable to reach or use their phone, it is important to transmit any sounds that may indicate signs of life regarding the phone's user. To minimize power consumed by radio transmissions it is useful to store sound information over a period of time, compress the sound information, and transmit the compressed sound information in bursts. It may also be useful to analyze some sound recordings on a server elsewhere rather than on the phone.

Sounds recorded may be filtered to focus on a spectrum or spectrums that are most indicative of life signs—for example breathing, and heartbeat. Voice may also be recorded. Normal cell phone operations are preferably planned so as to use minimal CPU processing cycles while in E-Mode. Compression of data acquired may be performed with focus only on data that represents sound(s) of interest—such as verbal messages from a buried user—or life status sounds such as breathing, heartbeat, or voice sounds.

Phone Sleep and Wake

An exemplary and non-limiting wake-up and sleep strategy as it relates to life sounds according to the invention comprises a wake-up according to a timed period, followed by an initial period of looking for life sounds, and to conserve power only recording sound if the phone system determines that some form of life sound is present. After another timed duration, another period occurs including again listening for life sounds.

In another embodiment of the sleep and wake-up strategy, a low power-consuming circuit in the phone watches and analyzes signals from the microphone and determines when voice is present. The phone system then wakes up, captures, analyzes and compresses the voice information, and then transmits the information in a short burst to the nearest tower or emergency transponder.

E-mode is triggered by one of a plurality of conditions. One exemplary condition is an E-mode initiating transmission received by the mobile phone. It can be sent by a conventional cell tower, however:
 a) one or more towers may be inoperable
 b) obstacles and rubble between the tower and the victim's phone, along with the distance to the tower, may make the signal indiscernible by the cell phone.

So, a local or portable RF device—as for instance a mobile/portable cellular base station—may be useful or required to ensure a strong signal is transmitted to enable buried phones to enter E-mode. Such an RF transmission may be any frequency, modulation, or data pattern, and may or may not be a normal cellular system signal. The portable RF device should be deployed as soon as possible after the disaster event occurs. If the portable RF device includes receive capability, it may be used in order to locate buried phones while their battery strength is still high immediately following the disaster, and also to initiate E-mode ASAP to preserve remaining battery life.

In order to map locations of victims with the greatest accuracy, another embodiment of the invention provides for building a map of buried mobile phone locations as quickly as possible while battery charge levels for the mobile phones are highest. This is accomplished by a system of one or more portable RF devices, where the portable devices are placed and moved while recording received information from buried mobile phones and their locations. This is especially useful if one or more cellular towers are not operational, or if signal strengths emitted by mobile phones are not high enough to be accurately measured at the towers, or if some of the buried mobile phones cannot receive signals from GPS satellites due to attenuation by rubble. One or more portable RF devices are placed on grid positions, and then queried to record both position and transmitted data from buried phones. After acquiring location and any phone-related data, each RF device is moved to another position on the grid. Phone locations are recorded by triangulation to supplement GPS data, or to provide a more accurate location than possible with GPS data. Thus a map of victim phone locations on an x-y grid of positions is established covering the area where victims are known or suspected to be buried in rubble.

Alternately, an RF transceiver device is positioned at a first grid position, and emits an E-mode initiating command, and then receives and records any detectable signals and information received from mobile hones in the vicinity. A direction finder on the RF transceiver device locates a direction for each identified mobile phone. The RF transceiver device is then moved to a next grid location and the process is repeated. When the RF transceiver device has been utilized at each grid position, then all recorded data is analyzed to triangulate and determine the position of each buried phone. A variation on this procedure uses three RF transceiver devices and walking them across the grid such that for at least one point in time during the process each buried phone is located within a triangle comprised of the three RF transceiver devices, such that signals received by the three RF transceiver devices enable direct location of the mobile phone trough triangulation.

FIG. 1 shows a geographical overview where one or more phones buried in rubble are within various distances of established cell towers and a mobile cellular base station placed in close proximity to the buried phones. Phones 102 are buried, for example, in collapsed building 104. Existing cell tower 106 is closest to phones 102 and cell tower 108 is located a further distance away. To provide better communications given the attenuation of RF signals by the rubble of house 104, or due to a failure of either or both of towers 106 and 108 due to the disaster, a portable base station or RF device 110 is utilized in close proximity to the rubble of collapsed house 104 in order to maximize the chance that transmissions will be successfully sent to, and received from, the one or more buried phones 102.

A second possible condition for triggering E-mode is a sudden reduction in signal strength from the same tower. Each cell phone knows what tower it is connected to. If the signal strength is measured at regular intervals and those intervals are short enough that the user would typically not move a considerable distance from one measurement to the next, then a sudden large drop in signal strength between two adjacent measurements can mean at least one of:
  a) The cell tower has ceased to function, possible due to a disaster condition that has disabled the cell tower.
  b) The user has suddenly been buried in rubble since the last measurement was performed.

Figure 2:
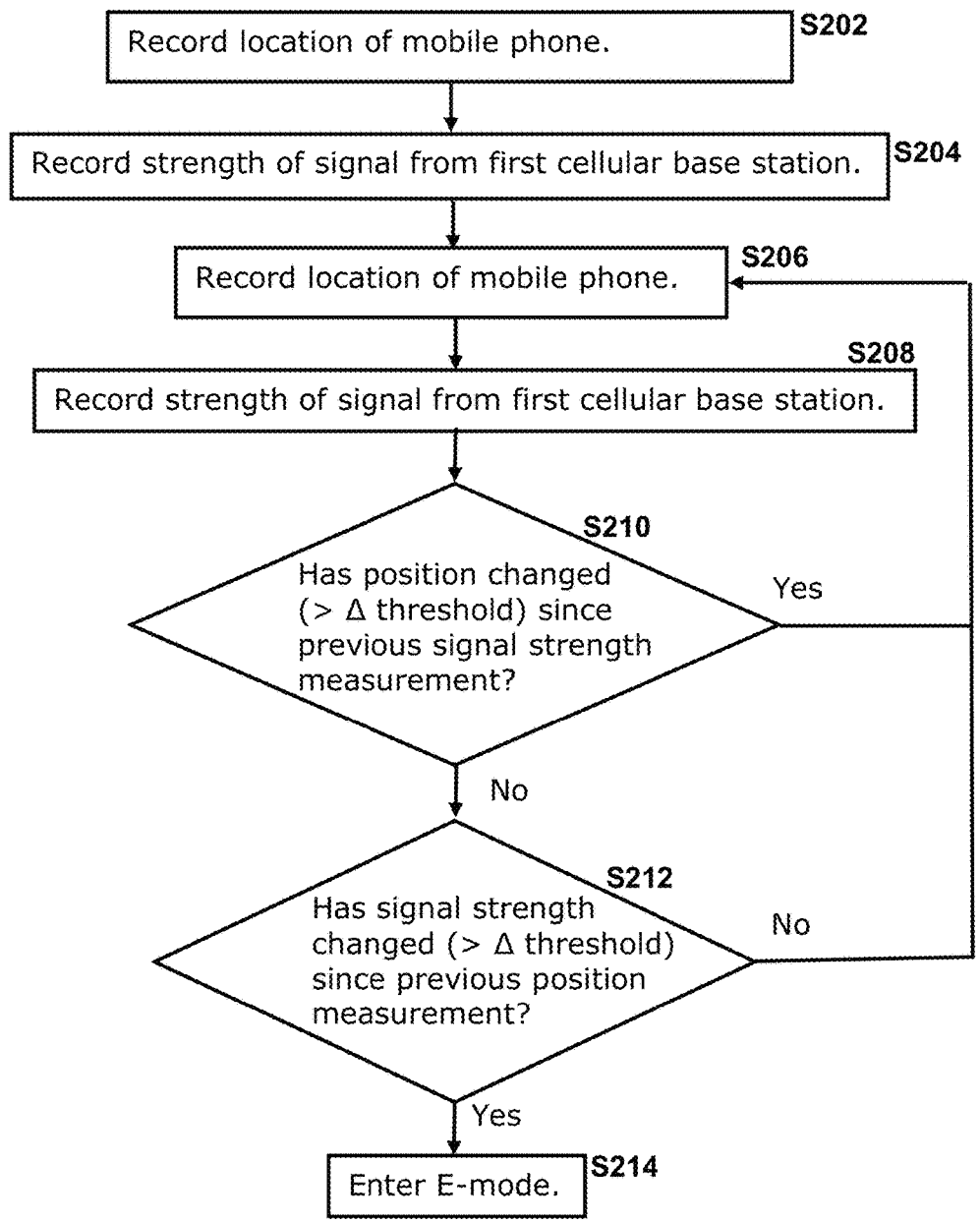
FIG. 2 shows an exemplary and non-limiting flow chart for determining that a sudden loss in signal strength received by a phone from a specific cellular base station indicates a probable emergency condition when the phone's position has not changed.

FIG. 2 shows an exemplary and non-limiting flow chart for determining that a sudden loss in received signal strength by a phone from a specific cellular base station indicates a probable emergency condition when the phone's position has not changed. In step S202 a location of the mobile phone is recorded. In step S204, the strength of a signal from a first cellular base station/tower is recorded. In step S206 the phone's location is recorded again and in step S208 the signal strength is recorded again. Then in step S210 the recorded positions from steps S202 and S206 are compared to determine if the phone has moved, with focus on movement in a horizontal plane. If there has been appreciable horizontal movement, then it is assumed that an emergency condition does not exist and the process moves ahead to step S212. For determining appreciable movement, a threshold amount is used in the comparison, and only if the movement is greater than this delta threshold amount is it determined that movement has occurred. If no appreciable movement is detected, then the process loops back to step S206 and repeats again.

If no appreciable movement of the phone has occurred per step S210, then the process proceeds to step S212 where the measured signal strengths per steps S204 and S208 are compared, and if the difference between those measurements exceeds a delta threshold amount then it is assumed that an emergency condition exists and the phone enters S214 E-mode.

In response to a determination of a possible emergency condition based on signal strength loss from a first tower/base station, the mobile phone can look to see if a second tower—one that previously had measureable signal strength—has also suddenly reduced its signal strength. If that is the case, then it confirms that a disaster has possibly struck and the cell phone would enter E-mode. To determine that the phone's location has not changed during the time that the sudden drop in signal strength has occurred, the phone's GPS location can also be monitored.

Also, one common scenario where a cell phone may experience a sudden drop in signal strength while remaining in a constant position from a horizontal perspective is while travelling vertically in an elevator—most significantly when descending in an elevator from a main floor into a basement/underground area. Under an assumption that a user in a non-emergency situation may only temporarily be in the underground area, just having a delay prior to the cell phone automatically entering E-mode may avoid prematurely entering E-mode. If the user habitually spends time in a location that tends to trigger E-mode actuation, then the GPS coordinates for that location can be entered as a location where E-mode should not be automatically triggered. In such situations, during an emergency E-mode can still be triggered remotely, or alternately by the user should they be conscious and able to operate their phone.

If GPS signals are receivable for altitude sensing during such a vertical movement, then the phone can potentially avoid entering E-mode. If however, GPS signals are not receivable, then the inclusion of an altitude sensing transducer in the phone can also detect any sudden vertical movement in an elevator that may cause a sudden drop in signal strength. Inertial sensing devices may also be included to sense movement of the mobile phone in horizontal and/or vertical directions.

Operation of the mobile phone when in E-mode should assume that the victim has no ambient light in which to view the phone, and also may not be able to reach the phone. When E-mode is entered, a message is played for the user on the phone's speakerphone.

The message may include for example and without limitation at least one of the following:
  a) "Your phone is now in Emergency mode. If everything is ok and this is not desired, please press or speak "1" to resume normal mode."
  b) "Your phone is now in Emergency mode. If there has been an emergency and if you can hear this message but are not able to locate or reach this phone, please speak a message after the tone describing your condition and if possible it will be relayed to an emergency rescue team. Please include:

i) Your physical condition; and
ii) Your last location in the building prior to the emergency."

The victim's response to the message (b) request above can be transmitted immediately if a connection to a tower is available, and/or can be recorded and transmitted at a later time when some form of emergency connection as described herein is available.

Other messages to a mobile phone's user upon entering E-mode may include for example and without limitation any or all of:

explaining the function of E-mode;
explaining how to continue to use the mobile phone while minimizing battery consumption under E-more operation;
explaining how to send a message to emergency responders if the user is not able to reach the phone; and/or
explaining how to cancel E-mode if there is no emergency present.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts, while remaining within the scope of the appended claims. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A method for operating a mobile phone in an emergency mode (hereinafter: E-mode) when suddenly buried by rubble, comprising: detecting, at the mobile phone, a sudden reduction in signal strength received from a first cellular base station; determining that a position of the mobile phone has not changed during the sudden reduction in signal strength; and if the position of the mobile phone has not changed during the sudden reduction in signal strength, the mobile phone entering the E-mode including reducing one or more of: a signal strength of transmissions by the mobile phone; a transmission duty cycle by the mobile phone; and receiver circuit power consumption of the mobile phone.

2. The method of claim 1 further comprising:
determining that the sudden reduction in signal strength received from the first cellular base station is not due to a vertical movement of the phone.

3. The method of claim 2 further comprising:
determining the movement of the mobile phone by analyzing signals received from GPS satellites.

4. The method of claim 2 further comprising:
determining the movement of the mobile phone by analyzing information supplied by a sensing device included in the mobile phone.

5. The method of claim 1 further comprising:
detecting an E-mode initiating command sent from a cellular base station and in response, entering E-mode.

6. The method of claim 1 further comprising:
upon entering E-mode, playing an audible message to a user of the phone, announcing the entry into E-mode, including one or more of:

explaining the function of E-mode;
explaining how to continue to use the mobile phone while minimizing battery consumption under E-mode operation;
explaining how to send a message to emergency responders if the user is not able to reach the phone; and
explaining how to cancel E-mode if there is no emergency present.

7. The method of claim 1 further comprising:
upon entering E-mode, playing an audible message to a user of the phone, announcing the entry into E-mode, including:
explaining the function of E-mode.

8. The method of claim 1 further comprising:
upon entering E-mode, playing an audible message to a user of the phone, announcing the entry into E-mode, including:
explaining how to continue to use the mobile phone while minimizing battery consumption under E-more operation.

9. The method of claim 1 further comprising:
upon entering E-mode, playing an audible message to a user of the phone, announcing the entry into E-mode, including:
explaining how to send a message to emergency responders if the user is not able to reach the phone.

10. The method of claim 1 further comprising:
upon entering E-mode, playing an audible message to a user of the phone, announcing the entry into E-mode, including:
explaining how to cancel E-mode if there is no emergency present.

11. The method of claim 1 further comprising:
entering E-mode in response to detecting an E-mode initiating command sent from an RF signal transmitting device.

12. A method for operating a mobile phone in an emergency mode (hereinafter: E-mode) when buried by rubble, comprising: detecting, at the mobile phones a sudden reduction in signal strength received from a first cellular base station; determining that a position of the mobile phone has not changed during the sudden reduction in signal strength; if the position of the mobile phone has not changed during the sudden reduction in signal strength, the mobile phone entering the E-mode including reducing one or more of: a signal strength of transmissions by the mobile phone; a transmission duty cycle by the mobile phone; and receiver circuit power consumption of the mobile phone, wherein reducing power consumption for the receiver circuit within the mobile phone enables continued emergency communication while conserving battery power while receiving, a faint signal; analyzing sounds detected by a microphone included with the mobile phone, and transmitting information indicative of those sounds, wherein the detected sounds are indicative of signs of life regarding the phone's user, and wherein the phone's user is unconscious or constrained in such a way that they are unable to reach or use their phone.

13. The method of claim 12 wherein the analyzing includes differentiating between background noise and voice noise, and
wherein sounds related to voice noise are compressed and burst transmitted.

14. The method of claim 12 wherein the analyzing includes differentiating between background noise, voice noise, and sounds related to life signs;

wherein the sounds related to life signs include one or more of breathing and heartbeat; and
wherein the sounds related to life signs are compressed and burst transmitted.

15. The method of claim 12 further comprising:
compressing audio information related to the detected sounds;
transmitting the compressed audio information; and
analyzing the compressed audio information on a server or a Cloud server.

16. The method of claim 12 further comprising:
entering E-mode in response to detecting an E-mode initiating command sent from an RF signal transmitting device.

17. The method of claim 12 further comprising:
upon entering E-mode, playing an audible message to a user of the phone, announcing the entry into E-mode, including:
explaining the function of E-mode.

18. The method of claim 12 further comprising:
upon entering E-mode, playing an audible message to a user of the phone, announcing the entry into E-mode, including:
explaining how to continue to use the mobile phone while minimizing battery consumption under E-more operation.

19. The method of claim 12 further comprising:
upon entering E-mode, playing an audible message to a user of the phone, announcing the entry into E-mode, including:
explaining how to send a message to emergency responders if the user is not able to reach the phone.

20. The method of claim 12 further comprising:
upon entering E-mode, playing an audible message to a user of the phone, announcing the entry into E-mode, including:
explaining how to cancel E-mode if there is no emergency present.

* * * * *